P. McGRATH.
POTATO DIGGER.
APPLICATION FILED AUG. 3, 1909.
1,024,269.
Patented Apr. 23, 1912.
4 SHEETS—SHEET 1.
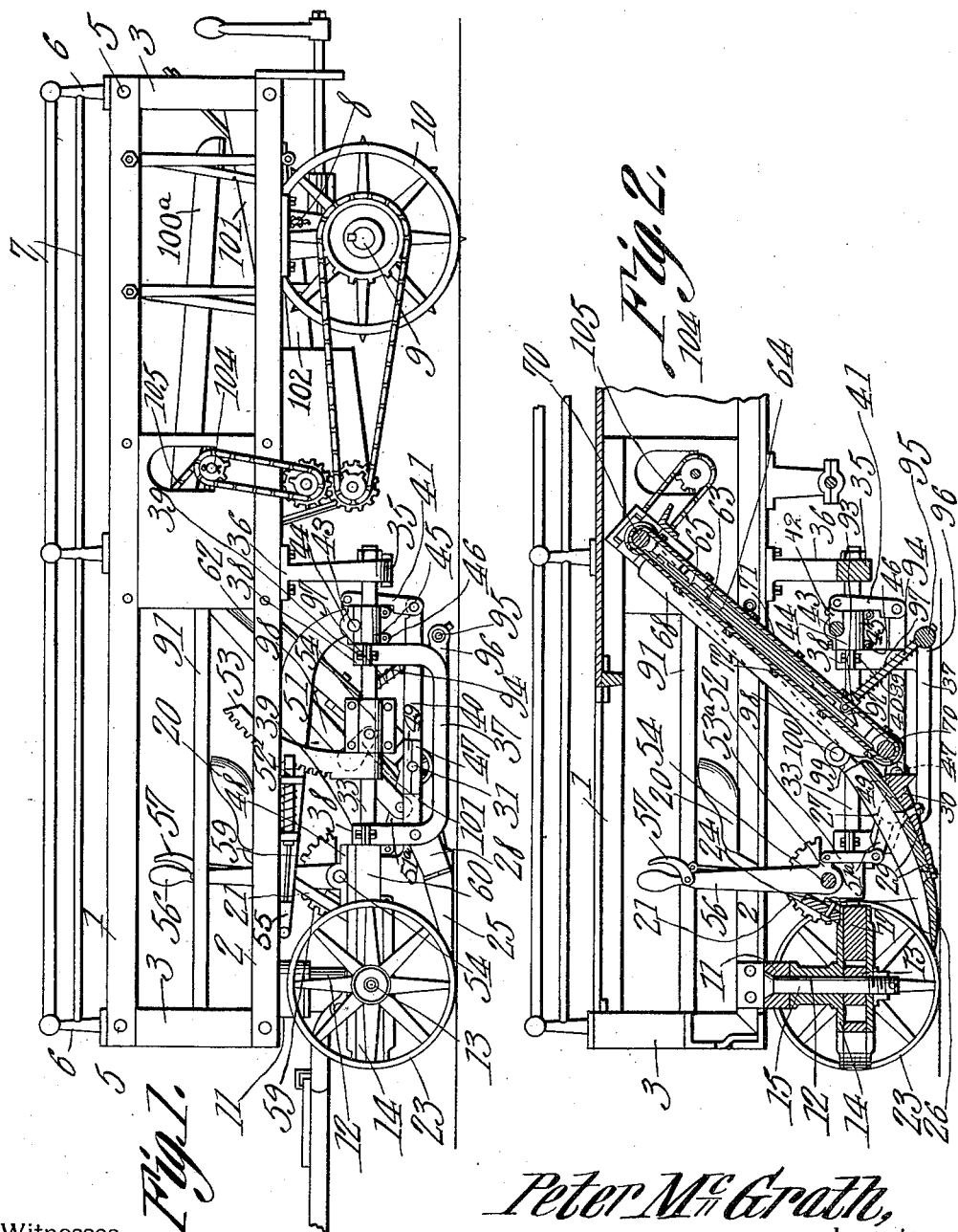
Witnesses
Peter McGrath,
Inventor
by C. A. Snow & Co.
Attorneys

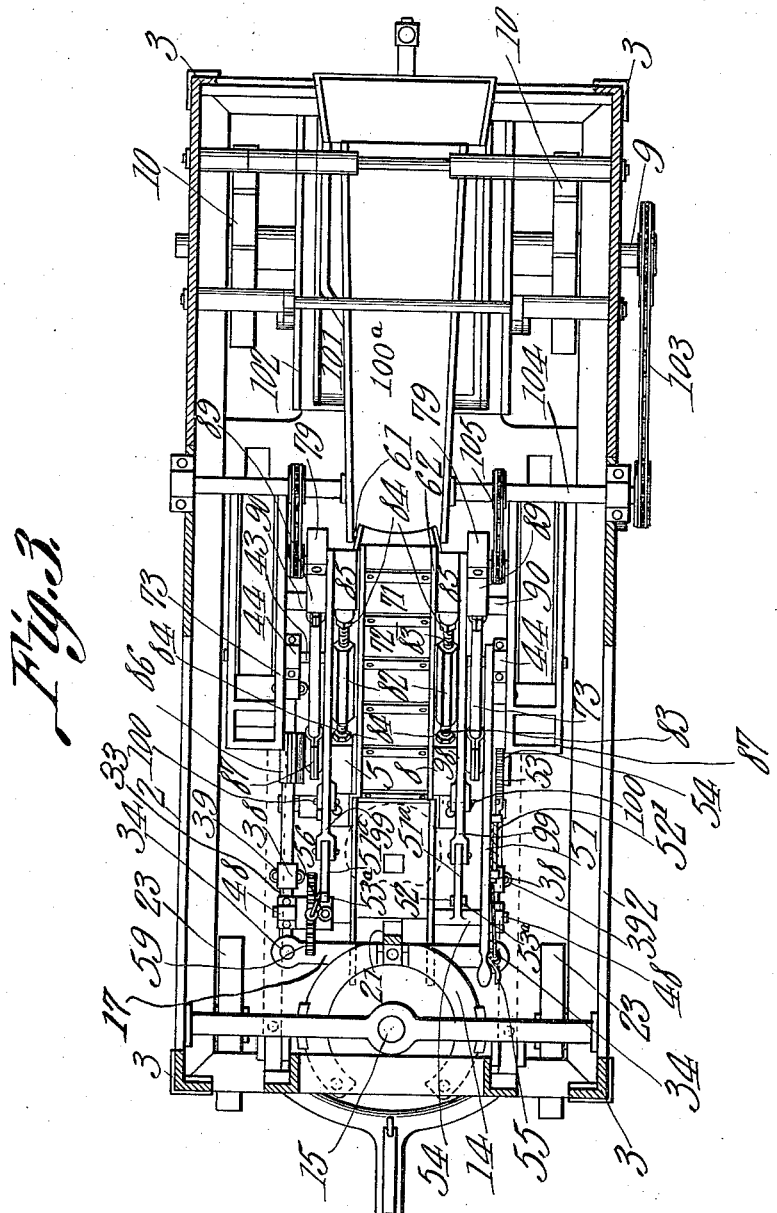

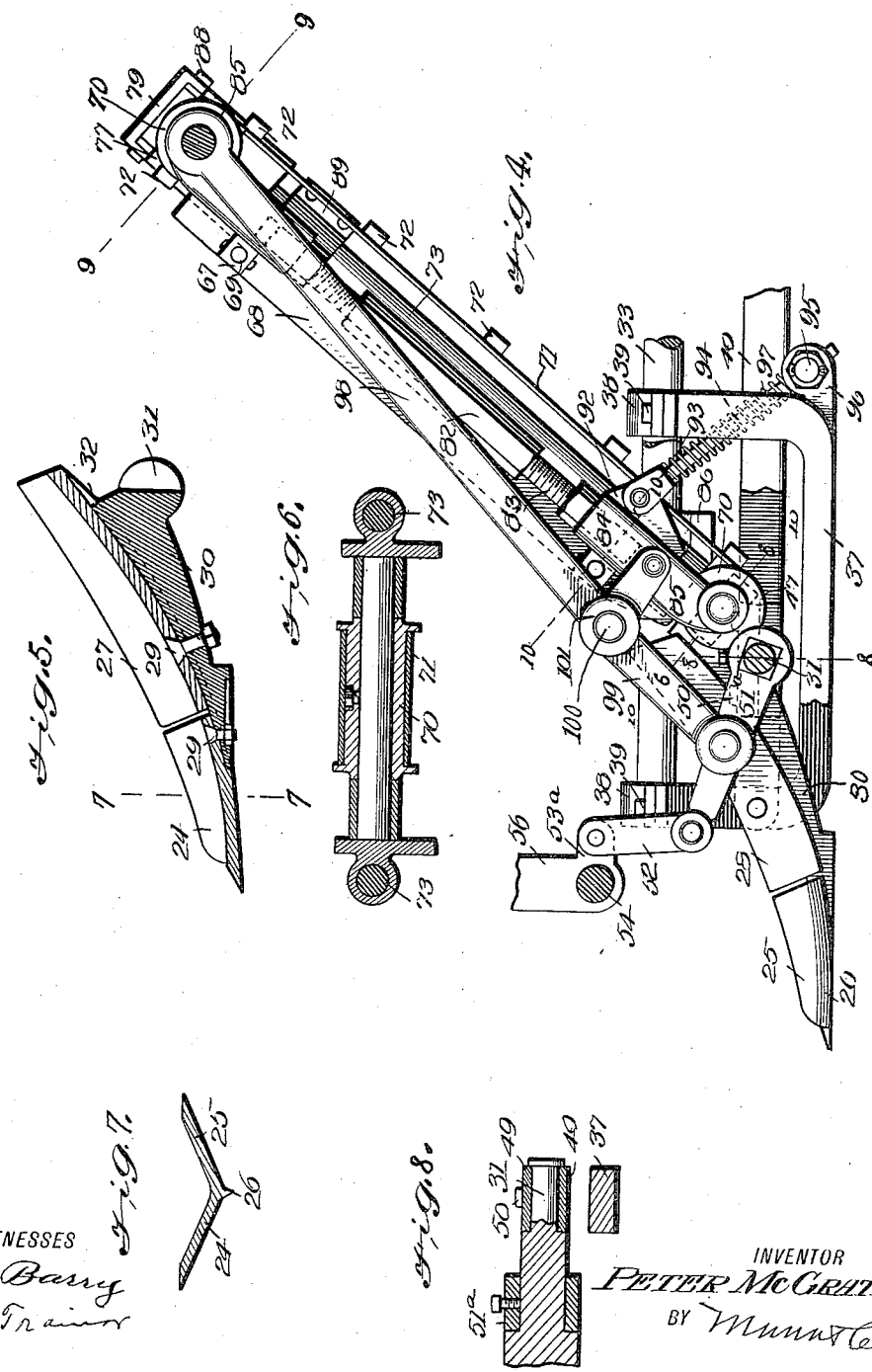

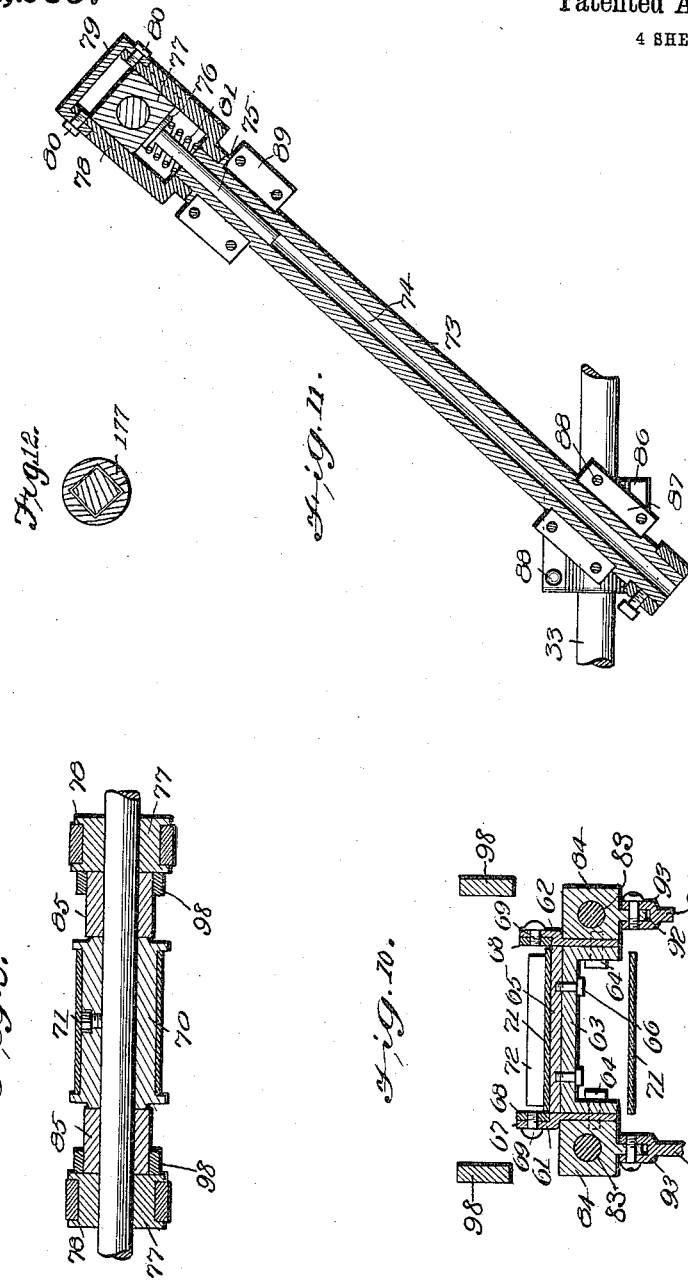

UNITED STATES PATENT OFFICE.

PETER McGRATH, OF DENVER, COLORADO.

POTATO-DIGGER.

1,024,269. Specification of Letters Patent. Patented Apr. 23, 1912.

Application filed August 3, 1909. Serial No. 511,017.

*To all whom it may concern:*

Be it known that I, PETER McGRATH, a citizen of the United States, and a resident of Denver, in the county of Denver, State of Colorado, have invented certain new and useful Improvements in Potato-Diggers, of which the following is a specification.

My invention is an improvement in potato diggers, and consists in certain novel constructions and combinations of parts hereinafter described and claimed.

The objects of the invention are to improve the construction and increase the efficiency of such devices.

Referring to the drawings forming a part hereof: Figure 1 is a side elevation of a potato digger provided with the improvements of the present invention. Fig. 2 is a vertical longitudinal section through the forward end of the construction shown in Fig. 1. Fig. 3 is a plan view of the construction shown in Fig. 1. Fig. 4 is a side elevation of the digger and elevator. Fig. 5 is a central longitudinal section of the digger. Fig. 6 is a section on the line 6—6 of Fig. 4. Fig. 7 is a section on the line 7—7 of Fig. 5. Fig. 8 is a section on the line 8—8 of Fig. 4. Fig. 9 is a section on the line 9—9 of Fig. 4. Fig 10 is a section on the line 10—10 of Fig. 4. Fig. 11 is a longitudinal section through one of the guides for the elevator. Fig. 12 is a detail side view partly in section of a portion of the trunnion of the digger.

The embodiment of the invention shown in the drawings consists of a frame composed of upper and lower side bars 1—2, corner uprights 3, and cross bars suitably connected together by bolts or rivets 5, and all preferably constructed of angle iron as shown. At each corner of the frame a standard 6 is provided, and rods 7 are supported by the standards, the rods extending parallel with the side bars. Bearing blocks 8 are arranged near the rear ends of the side bars 2, and an axle 9 is journaled in the blocks, and wheels 10 are journaled on the axle. A cross plate 11 is secured to the under face of the frame near the front end, and a bolster 12 is arranged beneath the cross plate. A front axle 13 is secured between two segmental plates 14, the upper one of which is integral with or secured to the bolster, and a king pin 15 extends through registering openings in the cross plate, the bolster, the segmental plates and the axis for pivotally connecting the axle to the frame. Wheels 23 are journaled on the ends of the axle 13 and a seat 20 is connected with the segmental plates by a spring plate 21.

The digging device shown in detail in Figs. 4 to 7 consists of a plow, which is composed of a substantially horizontal portion and an inclined portion. The horizontal portion consists of two plates 24 and 25 arranged at an angle with respect to each other, the apex of the angle being downward and defined by a rib 26 on the under face of the plow. The inclined portion is similar to the horizontal portion in cross section, consisting of plates 27 and 28 inclined to each other at an obtuse angle, the apex of the angle being downward. The plates are integral with each other, and both sections of the plow are bolted by bolts 29 to a block 30 which is provided with trunnions 31 at its rear corners, and the plates are recessed, as at 32, to receive the block. A rod 33 is pivoted to each end of a cross plate 17 by a bolt 34 and the rods extend rearwardly in parallel relation, the rear ends thereof being received in bearings 35 in brackets 36 depending from the frame. A U-shaped hanger 37 is adjustable on each rod 33, the arms of the hangers being provided with sectional bearings 38, which may be tightened on the rod by bolts 39. A bar 40 is pivoted by its front end to the front arm of each hanger, and a link 41 connects the rear end of each bar to an arm 42 on a rock shaft 43 journaled in sectional bearings 44 which are adjustable on the rods 33 by means of sectional bearings 45, which may be tightened on the rods 33 by bolts 46. A lever 51 is rigidly connected with the rock shaft and is provided with a spring actuated tooth 52′, engaging a quadrant 53 provided with a bearing 54 adjustable on the adjacent rod 33, and the tooth is operated by a grip 55 pivoted to the lever. It will be evident that by raising and lowering the lever the rear end of the bars 40 may be adjusted with respect to the ground. Each of the bars 40 is provided near its front end with a recess 47, and near the longitudinal center of the recess is a bearing, in which is journaled the adjacent trunnion 31 of the plow, and the trunnion is secured in place by a bearing block 49 which is held to the bar in any suitable manner, such as by means of the bolts 50, Fig. 8. An arm 51ᵃ is secured to each trunnion, the trunnions being squared as shown in Fig. 12, and the arms having at one end a square opening for receiving the trunnion, and the other end of the arm is connected by a link 52 with an arm 53ª on a rock shaft 54 journaled in bearings 48 on blocks 60 which are slidable on the rods 33, and a lever 56 is secured to the shaft. The lever is provided with a spring actuated tooth which engages a toothed quadrant 59 on the block and is operated by a grip 57 pivoted to the lever.

It will be evident from the description that by the proper manipulation of the levers 51 and 56 the plow may be adjusted to a variety of positions, and that by moving the hangers and bearing blocks on the rods 33 the plow may be moved toward the front or rear of the frame and secured in such adjusted position.

The elevator is arranged immediately behind the plow and the lower end thereof is connected with the upper end of the plow in a manner to be presently described. The said elevator comprises spaced plates 61 and 62 which are connected by cross bars 63, the ends of the cross bars being bent at an angle to the body portion and secured to the side plates by cap screws 64, and a floor 65 is secured to the cross bars by bolts 66. The side plates project above the floor and are offset outwardly, as at 67, and wear plates 68 are secured to the inner face of the offset portions by screws 69. A roller 70 is journaled at each end of the side plates, and an endless belt or apron 71 provided at spaced intervals with transverse cleats 72 is supported by the rollers. A bar 73 having a cylindrical bore 74 is adjustably and pivotally secured to the rod 33 by means of sectional bearings, pivoted together. One of the bearings 86 as shown in Fig. 11, slidably engages the rod 33, and the other 87 which is pivoted to the first named, engages the bar 73, and the sections of the respective bearings are secured together by bolts 88. By loosening the bolts, the bearings may be adjusted on the rods and bars. The upper end of the bar is supported by a similar mechanism consisting of bearings 89 and 90 Fig. 3 pivoted together, the one, 89, engaging the bar 73, and the other, 90, engaging a rod 91 arranged longitudinally of the frame on each side thereof. In the upper end of the bar 73 is slidable a rod 75, which is provided with a head 76, on which rests a block 77 provided with a bearing in which is journaled one end of the shaft of the upper roller 70. The blocks 77 are slidable in guideways 78, each of which has an opening to receive the upper end of the adjacent bar, and a cap 79 closes the upper end of the guide-way and is secured in place by cap screws 80. A spring 81 is arranged between the end of the bar and the block for normally retaining the block at the upper end of the guideway, and the upper end of the bar is rounded to fit the opening of the block. A turn-buckle is arranged at each side of the side plates, each of the turn-buckles consisting of a central screw 82 having threaded ends 83, and end sockets 84 threaded to receive the ends of the screw, and having bearings 85 for receiving the extended ends of the rollers. Each of the lower end sockets is provided with a rearwardly extending lug 92, which is pivoted between ears 93, on a yoke secured to the end of a rod 94 which is slidable through a shaft 95 supported in rearwardly extending lugs 96 on the U-shaped hangers 37, and a spring 97 encircles the rod between the ears and the shaft.

A toggle mechanism consisting of levers 98 and 99 pivoted together, as at 100, is arranged on each side of the elevator, the free end of the lever 98 being pivoted on the extended ends of the upper roller 70, and the free end of the lever 99 at approximately the center of the arm 51ª, and a link 101 connects the joint of the toggle with the adjacent socket of the turn-buckle.

It will be evident from the description that when the lever 56 is manipulated to swing the plow on its trunnions the lower end of the elevator will be moved backward or forward by means of the toggle mechanism. The lower end of the elevator is slidable freely on the rods 94, but is held closely up against the rear end of the plow by the springs 97. The springs, however, do not prevent the rearward movement of the lower end of the elevator when the front end of the plow is elevated.

The elevator delivers the potatoes to a shaker 100ª. From the shaker 100ª the potatoes pass to the sorting frames 101, and 102, after which they are disposed of in any suitable manner. As the construction of the shaker, sorting frames and means for disposing of the potatoes are not claimed specifically herein, a description thereof is deemed to be unnecessary.

The elevator is operated in any suitable manner such, for example as by means of the sprocket chain 103 shown in Fig. 3, said sprocket chain being operated by the rear wheels 10. The sprocket chain 103 operates a shaft 104 and from the shaft 104 power is transmitted through a sprocket chain 105 to the elevator.

The plow may be adjusted to meet any ordinary conditions as to depth and the like, and the rear end thereof is always retained in proper position with respect to the elevator by the toggle mechanism connecting them together, so that the potatoes cannot under any adjustment of the plow escape at the junction of the elevator therewith. Moreover the plow and elevator can be adjusted longitudinally with relation to the supporting rods 33, and the elevator accommodates itself to all the adjustments of the plow.

I claim:

1. In a device of the class described, a wheel supported frame, a rod supported below the frame at the front and at each side thereof, a substantially U-shaped plow having its apex downward between the rods, said plow having oppositely extending trunnions, U-shaped hangers having their arms secured to the rods, a bar pivoted by one end to the front arm of each hanger, said bar having a bearing intermediate its ends for receiving the adjacent trunnion, arms secured to the trunnions, an elevator having its lower end adjustably connected with the rods, a toggle on each side of the elevator and comprising levers pivoted together at one end, the outer end of one lever being pivoted to the upper end of the elevator, and the outer end of the other to the adjacent arm intermediate its ends, a link connecting the levers at their junction with the elevator, a lever connected with the outer ends of the arms for moving the same, a spring pressing the lower end of the elevator toward the plow, and a lever connected with the end of the bar for raising and lowering the same.

2. In a device of the class described, a frame, a plow having trunnions below the frame, a bar on each side of the frame and pivoted by the front end thereto, and provided with a bearing for receiving the adjacent trunnion, means connected with the rear end of the bar for raising and lowering the same, an arm rigidly connected with each trunnion, means connected with the other end of the arm for moving the same, an elevator behind the plow, a spring pressing the lower end of the elevator toward the plow, a pair of levers on each side of the elevator and pivoted together by their adjacent ends, the outer end of one lever being pivoted to the upper end of the elevator, and the outer end of the other to the arm intermediate its ends, and a link connecting the junction of the arms with the lower end of the elevator.

3. In a device of the class described, a frame, a plow below the frame, an elevator behind the plow, a spring pressing the lower end thereof toward the plow, an arm rigidly connected with each side of the plow, a pair of pivoted levers at each side of the elevator, the outer end of one member of each pair being pivoted to the upper end of the elevator, and the outer end of the other to the adjacent arm intermediate its ends, a link connecting the pivot of the levers with the lower end of the elevator, and means for swinging the arms.

4. In a device of the class described, a plow, an elevator, springs pressing the adjacent end of the elevator toward the plow, an arm rigid with the plow, means for swinging the arm, and a connection between the arm and each end of the elevator.

5. In a device of the class described, a plow, an elevator, an arm rigid with the plow, means for swinging the arm, and a connection between the arm and each end of the elevator.

6. In a device of the class described, a pivotally mounted support, a plow pivotally mounted on said support, a pivotally mounted elevator, and means for yieldingly holding the elevator in juxtaposition to the plow.

7. In a device of the class described an adjustable pivotally mounted support, a plow pivoted on said support and a movable elevator adapted automatically to accommodate itself to the different adjustments of the plow.

8. In a device of the character specified, the combination of a plow, an elevator, means for yieldingly supporting the upper end of the elevator, and means for yieldingly pressing the lower end of the elevator toward the plow.

9. In a device of the character specified, the combination of a plow, an elevator, a yieldingly mounted bearing for the upper end of the elevator, and means for yieldingly pressing the lower end of the elevator toward the plow.

10. In a device of the character specified, the combination of a plow, an elevator, a spring supported bearing for the upper end of the elevator, and spring means for yieldingly forcing the lower end of the elevator toward the plow.

11. In a device of the character specified, a pair of supporting levers, a digger pivotally connected with said levers, and an elevator connected with said digger and being pivotally movable with relation thereto.

12. A device of the character specified comprising a pair of supporting levers, a digger pivotally mounted thereon, toggle members pivotally connected with said digger, an elevator pivotally connected with said toggle members, and means for forcing the lower end of said elevator toward said digger.

13. A device of the character specified having a supporting frame, supporting levers longitudinally adjustable thereon, a digger movable on said supporting levers, and an elevator movably connected with said digger.

14. In a potato digger, a pair of pivotally mounted supporting bars, a digger pivotally mounted thereon, toggle members pivotally connected with said digger, an elevator pivotally connected with said toggle members, and means for yieldingly pressing the lower end of the elevator toward the digger.

15. In a potato digger, a pair of pivotally mounted supporting bars, a digger pivotally mounted on said bars, arms rigidly secured to said digger, toggle members pivotally connected with said arms, an elevator pivotally connected with said toggle members, and means for forcing the lower end of said elevator toward said digger.

16. In a potato digger, a pair of pivotally mounted supporting bars, a digger pivotally mounted on said bars, arms rigidly secured to said digger, toggle members pivotally connected with said arms, an elevator pivotally connected with said toggle members, and means for yieldingly pressing the lower end of the elevator toward the digger.

PETER McGRATH.

Witnesses:
MARTIN SHIRK,
CARL OCKEL.

Copies of this patent may be obtained for five cents each, by addressing the "Commissioner of Patents, Washington, D. C."